United States Patent
Mintz et al.

(10) Patent No.: US 8,538,855 B2
(45) Date of Patent: *Sep. 17, 2013

(54) FRACTIONAL PAY-UP TICK FOR USE IN RELATION TO TRADING STRATEGIES

(75) Inventors: Sagy P. Mintz, Lincolnshire, IL (US); Eric M. Herz, Naperville, IL (US); Alexander D. Deitz, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/751,269

(22) Filed: Mar. 31, 2010

(65) Prior Publication Data

US 2010/0191641 A1    Jul. 29, 2010

Related U.S. Application Data

(63) Continuation of application No. 11/240,684, filed on Sep. 30, 2005, now Pat. No. 7,774,261.

(51) Int. Cl.
    *G06Q 40/00*     (2012.01)
(52) U.S. Cl.
    USPC ................................ 705/37; 705/35; 705/1.1
(58) Field of Classification Search
    CPC ........ G06Q 40/00; G06Q 40/04; G06Q 40/06
    USPC .......................................................... 705/37
    See application file for complete search history.

(56) References Cited

U.S. PATENT DOCUMENTS

| | | | |
|---|---|---|---|
| 6,012,046 A * | 1/2000 | Lupien et al. | 705/36 R |
| 6,618,707 B1 | 9/2003 | Gary | |
| 6,772,132 B1 | 8/2004 | Kemp | |
| 7,127,424 B2 | 10/2006 | Kemp | |
| 7,299,208 B1 | 11/2007 | Bailon | |

(Continued)

FOREIGN PATENT DOCUMENTS

| | | |
|---|---|---|
| WO | 03/077061 | 9/2003 |
| WO | 2007019402 A2 | 2/2007 |
| WO | 2007019403 A2 | 2/2007 |

OTHER PUBLICATIONS

Chapman: "The Big Board's Express' Service: The Big Board has two new systems that allow traders to bypass the specialists and automatically execute orders. It's a sign of the progress of electronic trading", Traders Magazine (Jan. 1, 2001): 54.*

*Primary Examiner* — Eric T Wong
*Assistant Examiner* — Edward Baird
(74) *Attorney, Agent, or Firm* — McDonnell Boehnen Hulbert & Berghoff LLP

(57) ABSTRACT

A system and associated methods are provided for use of fractional pay-up ticks in relation to offset orders being sent for a trading strategy that involves trading a first tradeable object and at least a second tradeable object. According to one example method, when an indication is received that a quantity at a first price for the first tradeable object is filled, a plurality of offset orders for the second tradeable object is sent to an electronic order book of the second tradeable object. The plurality of offset orders is placed at a plurality of price levels determined based on at least one fractional pay-up tick value, the first price, and the desired spread price. A quantity for each order is determined based on a quantity divider rule that is applied to an offset quantity to offset the fill.

16 Claims, 12 Drawing Sheets

(56) References Cited

U.S. PATENT DOCUMENTS

| | | |
|---|---|---|
| 7,389,268 B1 | 6/2008 | Kemp |
| 7,418,416 B2 | 8/2008 | Guidi et al. |
| 7,437,325 B2 | 10/2008 | Kemp, II et al. |
| 7,536,344 B2 | 5/2009 | Singer et al. |
| 7,555,457 B2 | 6/2009 | Burns et al. |
| 7,574,391 B1 | 8/2009 | Monroe et al. |
| 7,577,600 B1 | 8/2009 | Zagara et al. |
| 7,577,608 B1 | 8/2009 | Mintz et al. |
| 7,596,528 B1 * | 9/2009 | Herz ................ 705/37 |
| 7,599,880 B1 | 10/2009 | Tam |
| 7,617,149 B2 | 11/2009 | Rosenthal et al. |
| 7,774,261 B1 * | 8/2010 | Mintz et al. .......... 705/37 |
| 7,774,262 B1 * | 8/2010 | Mintz et al. .......... 705/37 |
| 7,813,995 B2 * | 10/2010 | Burns et al. .......... 705/37 |
| 2003/0078872 A1 * | 4/2003 | Terashima et al. ..... 705/37 |
| 2003/0200167 A1 | 10/2003 | Kemp, II et al. |
| 2003/0236737 A1 | 12/2003 | Kemp |
| 2004/0172337 A1 | 9/2004 | Spoonhower |
| 2004/0267655 A1 | 12/2004 | Davidowitz et al. |
| 2005/0004852 A1 | 1/2005 | Whitney |
| 2005/0038732 A1 | 2/2005 | Sweeting et al. |
| 2005/0097026 A1 * | 5/2005 | Morano et al. ........ 705/37 |
| 2005/0125327 A1 | 6/2005 | Fishbain |
| 2005/0144112 A1 | 6/2005 | Singer |
| 2005/0154668 A1 * | 7/2005 | Burns et al. .......... 705/37 |
| 2005/0289042 A1 * | 12/2005 | Friesen ................ 705/37 |
| 2006/0129470 A1 | 6/2006 | Brendgen |
| 2009/0248566 A1 | 10/2009 | Miles |

\* cited by examiner

| Spread Setup | 802 Leg 1 | 804 Leg 2 |
|---|---|---|
| Gateway 806 | | |
| Product 808 | | |
| Product Type 810 | ▼ | ▼ |
| Contract 812 | | |
| Customer Account 814 | ▼ | ▼ |
| Spread Multiplier 816 | | |
| Order Size 818 | ± | ± |
| Queue Holder 820 | ± | ± |
| Volume Multiplier 822 | ± | ± |
| Inside Slop 824A | ± | ± |
| Outside Slop 824B | ± | ± |
| Inside Anti-Slop 826A | | |
| Outside Anti-Slop 826B | | |
| Auto Break 828 | | |
| Bid 830 | 108100 | 112175 |
| Ask 832 | 108105 | 112180 |
| Last 834 | 108100 | 112180 |
| Active Quote 836 | ☐ | ☐ |
| Cancel/Replace 838 | ☐ | ☐ |
| Hedge down 840 | ☐ | ☐ |
| Spread Calculations 842 | Implied ▼ | Implied ▼ |

FIG. 8

FRACTIONAL PAY-UP TICK FOR USE IN RELATION TO TRADING STRATEGIES

CROSS-REFERENCE TO RELATED APPLICATIONS

The present application is a continuation of application Ser. No. 11/240,684, which was filed on Sep. 30, 2005, now U.S. Pat. No. 7,774,261. This application is also related to application Ser. No. 11/415,851, which was filed on May 2, 2006 as a continuation of application Ser. No. 11/240,684, now U.S. Pat. No. 7,774,262. The entire contents of application Ser. Nos. 11/240,684 and 11/415,851 are hereby incorporated by reference.

TECHNICAL FIELD

The present invention is directed to electronic trading. More specifically, the present invention is directed towards automated order entry tools in an electronic trading environment.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions.

Electronic trading is generally based on a host exchange, one or more computer networks, and client devices. In general, the host exchange includes one or more centralized computers to form the electronic heart. Its operations typically include maintaining an exchange order book that records unexecuted orders, order matching, providing price and order fill information, and managing and updating a database that records such information. The host exchange is also equipped with an external interface that maintains uninterrupted contact to the client devices and possibly other trading-related systems.

Using client devices, traders link to the host exchange through one or more networks. A client device is a computer such as a personal computer, laptop computer, hand-held computer, and so forth that has network access. A network is a group of two or more computers or devices linked together in any fashion, which can be characterized by topology, protocol, and architecture. For example, some market participants may link to the host through a direct network connection such as a T1 or ISDN. Some participants may link to the host exchange through direct network connections and through other common network components such as high-speed servers, routers, and gateways. As explained in greater detail below, a client device may access an exchange through a gateway, and a router may route messages between the gateway and the exchange. The Internet, a well-known collection of networks and gateways, can be used to establish a connection between the client device and the host exchange. There are many different types of wired and wireless networks and combinations of network types known in the art that can link traders to the host exchange.

Sometimes, on their machines, traders use automated or semi-automated trading tools, collectively hereinafter referred to as automated tools, that automatically or semi-automatically send orders to the exchange. Such trading tools are usually provided to, among other things, facilitate fast and accurate order entry. For instance, an automated tool might quickly calculate one or more order parameters, such as order price or order quantity, based on market conditions, or some other reference condition, and then automatically send an order with these parameters to an exchange for matching. According to many existing and popular exchanges today, orders are electronically entered in an exchange order book in the sequence in which they are entered into the market (a first-in, first-out, commonly referred to as FIFO matching system). Based on this sequence, and the availability of market quantity, orders are filled, with priority given to the first order entered, then the second (next) order entered, and so forth. It should be understood that different matching systems can be used as well.

In addition to trading individual tradeable objects, many traders often implement trading strategies that involve simultaneous trading of two or more tradeable objects. One such trading strategy is commonly referred to as spread trading. In general, spread trading is the buying and/or selling of one, two, or more tradeable objects, the purpose of which is to capitalize on changes or movements in the relationships between the tradeable objects. The tradeable objects that are used to complete a spread are referred to as the outright markets or legs of the spread. A spread trade could involve buying tradeable objects, buying and selling tradeable objects, selling tradeable objects or some combination thereof.

As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

Spread trading may involve risk. For example, to achieve a spread differential, a trader typically works orders in two or more different markets. An order in one of those markets may fill, but the market conditions could change in another market, leaving the offsetting order unfilled and the spread incomplete. This results in the trading being "legged up," because only one side of the spread transaction is complete. As a result, the trader might lose large amounts of money to complete the transaction at an undesirable price, or remain unfilled totally.

Currently, there are two ways a trader could trade a spread. To avoid some of the risks of being "legged up," traders may trade in exchange provided spread markets. Electronic exchanges have introduced spread markets that guarantee the trader will not be "legged up" by taking certain precautions, for example. Accordingly, those exchange provided spreads might behave differently than if they did not provide this "no-legged" up guarantee. The different behavior expressed by these types of exchange-provided-spreads might result in less aggressive and less riskier trading than through conventional spread trading where the trader works orders in multiple markets to achieve a spread differential upon execution.

According to the second method, traders can use automated spread trading tools that allow them to create their own spreads, often referred to as synthetic spreads. Once a trader defines a synthetic spread, an automated spread trading tool may generate spread market data for the synthetic spread without facing the exchange-imposed limitations. While a trader who trades spreads using an automated spread trading tool may sometimes face a problem of getting legged up, the automated spread trading tool can generally allow the trader to be more aggressive in his/her trading, and thus potentially result in greater profits for the trader.

Typically, when a trader enters a desired spread order price based on the provided spread data, an automated spread trading tool will use spread setting parameters defined by the trader to place an order in the legs of the spread. As the markets in each leg move, individual spread leg orders may be re-priced by an automated spread trading tool to achieve the desired price defined for a synthetic spread. Re-pricing of orders generally involves canceling the existing order at one price and replacing it with a new order at another price. Such a mechanism, while very helpful to a trader to achieve a desired spread price, results in the newly submitted order being placed at the end of an order queue corresponding to the order's new price at an electronic exchange. However, it is desirable to have orders as close to the front of the order queue as possible to increase the likelihood of the orders getting filled. Thus, re-pricing the order increases the likelihood of the order not getting filled. It is desirable to offer tools that can assist a trader in trading in an electronic trading environment, and help the trader make trades at the most favorable prices in a speedy and accurate manner.

BRIEF DESCRIPTION OF THE DRAWINGS

Example embodiments are described herein with reference to the following drawings, in which:

FIG. 8 illustrates an example block diagram of a spread setup configuration window that can be used by a trader to define a spread;

DETAILED DESCRIPTION

I. Overview

Figure 1:
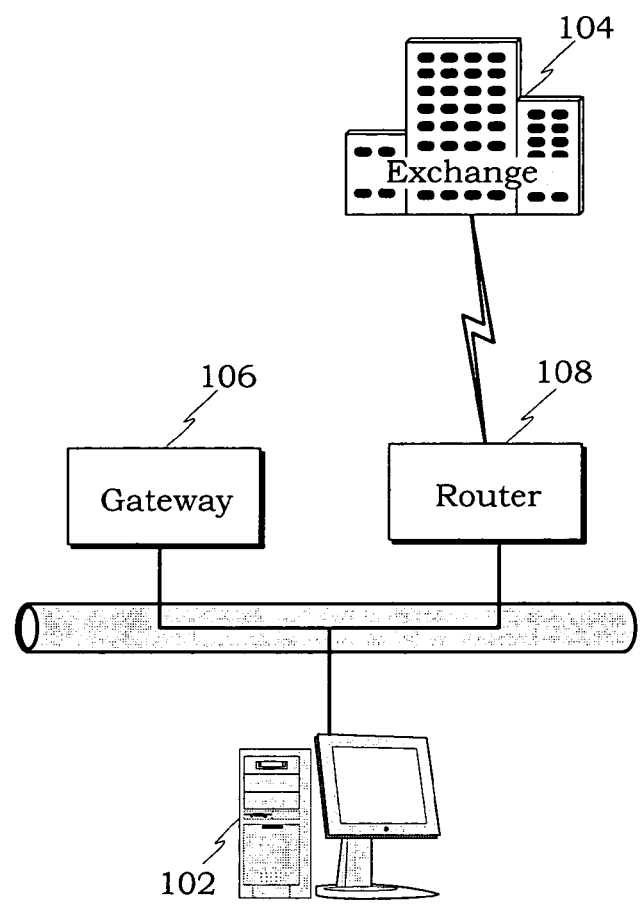
FIG. 1 illustrates a trading system for electronic trading according to an example embodiment, wherein the trading system includes a trading station where a trader can submit bids and offers for a tradeable object being traded at an electronic exchange.

Example system and associated methods described below provide means for intelligent placement and movement of orders within a range of prices. Using the described methods a trader may potentially get a more favorable queue position for spread leg orders when changes in the market corresponding to the leg order cause re-pricing of one or more leg orders. More specifically, according to the example embodiments described below, in addition to submitting a leg order at a calculated price level, additional orders at prices either below or above the calculated price level are submitted as well for the same leg to ensure a better queue position for the future re-priced leg orders. According to such an embodiment, if the market changes such that it is necessary to re-price either or both leg orders, the leg orders at the initially calculated prices may be deleted, and there will already be leg orders resting in the order queue at the re-calculated leg order prices.

Thus, one advantage of the example methods is that the re-priced leg orders will have better queue positions as compared to the orders that would be submitted upon detecting a re-price command in response to changing market conditions. Also, the example methods may result in more fills and fewer orders getting "legged up." It should be understood that additional advantages will be apparent to those skilled in the art as well. More details related to queue holder orders as well as other tools that can be used in relation to trading strategies will be described below.

Another trading tool that is described herein relates to intelligent placement of offset orders for predefined trading strategies. According to one example method, a trader may define a desired spread price for a spread strategy that includes at least a first tradeable object and a second tradeable object. The trader may also define at least one fractional pay-up tick value and a quantity divider rule for use in relation to a plurality of offset orders associated with the spread strategy. According to one example method, a first order may be automatically placed for the first tradeable object in an order book of a first electronic matching process corresponding to the first tradeable object, where the first order is placed at a first price that is computed based on the desired spread price and market conditions in the second tradeable object. Upon receiving an indication that at least a portion of an order quantity associated with the first order is filled, the method includes automatically placing a plurality of offset orders for the second tradeable object in an order book of a second electronic matching process corresponding to the second tradeable object. According to one example method, the plurality of offset orders is placed at a plurality of price levels determined based on the first price, the desired price and also based on the at least one fractional pay-up tick value. Also, an order quantity for each of the plurality of offset orders is determined based on the portion of the order quantity that was filled for the first tradeable object and further based on the quantity divider rule. More specifically, an offset quantity for the second tradeable object is divided based on the quantity divider rule among the plurality of offset orders that are placed at two or more price levels based on the fractional pay-up tick values applied to the price that achieves the desired spread defined for the spread strategy. More details related to offsetting orders using fractional pay-up ticks as well as other tools that can be used in relation to trading strategies will be described below.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. A First Example Trading System

FIG. 1 illustrates an example electronic trading system in which the example embodiments may be employed. In this example, the system comprises a trading station 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the trading station 102 with orders from other trading stations (not shown). The electronic exchange 104 may list one or more tradeable objects for trade. While not shown in the figure for the sake of clarity, the trading system may include other devices that are specific to the client site like middleware and security measures such as firewalls, hubs, security managers, and so on, as understood by a person skilled in the art.

The computer employed as the trading station 102 generally can range from a hand-held device, laptop, or personal computer to a larger computer such as a workstation and multiprocessor. An illustrative personal computer uses Pentium™ microprocessors and operates under a Windows 2000™, Windows NT™, or Windows XP™ operating system with 3Com's 3CR990-TX-97 network card. Generally, the trading station 102 includes a monitor (or any other output device) and an input device, such as a keyboard and/or a two or three-button mouse to support click based trading, if so desired. One skilled in the art of computer systems will understand that the present example embodiments are not limited to any particular class or model of computer employed for the trading station 102 and will be able to select an appropriate system.

The computer employed as the gateway 106 generally can range from a personal computer to a larger computer. An illustrative gateway 106 computer may use Pentium™ microprocessors and may operate under a Windows 2000™ or Windows NT™ (server or workstation) operating system. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a trading station or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

It should also be noted that the trading station 102 generally executes application programs resident at the trading station 102 under the control of the operating system of the trading station 102. Also, the gateway 106 executes application programs resident at the gateway 106 under the control of the operating system of the gateway 106. In other embodiments and as understood by a person skilled in the art, the function of the application programs at the trading station 102 may be performed by the gateway 106, and likewise, the function of the application programs at the gateway 106 may be performed by the trading station 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system; these illustrations are meant to be helpful to the reader and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station 102, the gateway 106, and the router 108 may still communicate over a local area network, but the router 108 may communicate with the matching process at the electronic exchange through another connection means besides a T1, T3, or ISDN.

In yet another example illustration, the gateway 106 may be housed at, or near, its corresponding electronic exchange 104. According to this instance, the trading station 102 may communicate with the gateway 106 over a wide area network or through the use of a T1, T3, ISDN, or some other high speed connection.

In another example illustration, the gateway 106 may be located remote from the trading station 102 and remote from the electronic exchange 104, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

III. A Second Example Trading System

Figure 2:
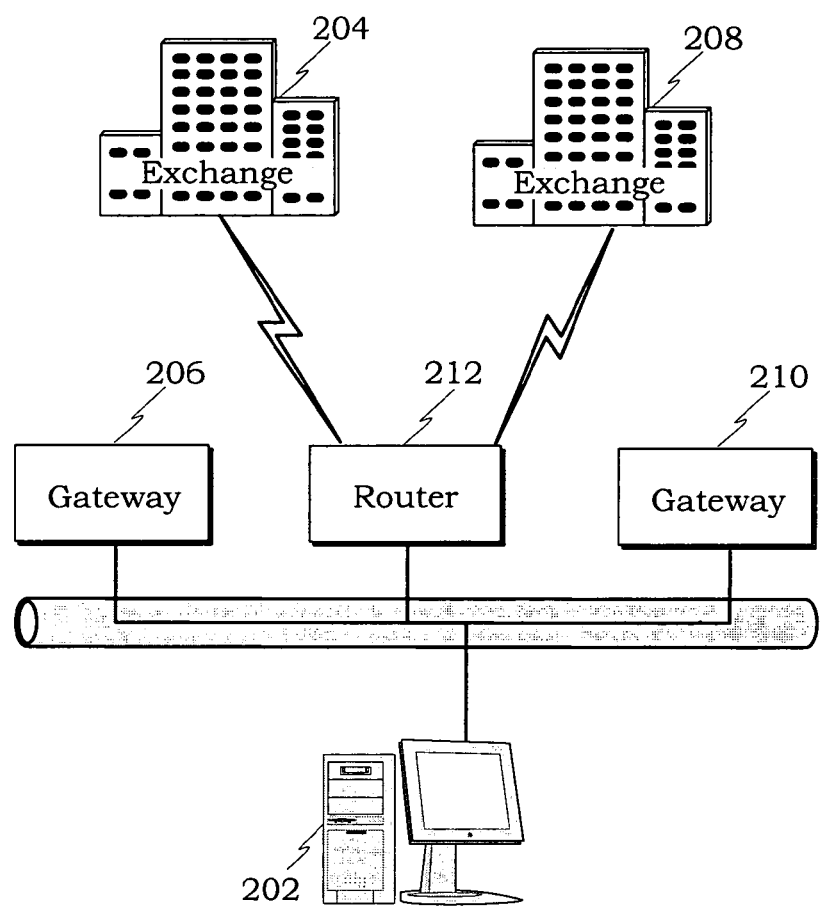
FIG. 2 illustrates another trading system for electronic trading according to another example embodiment, wherein this trading system includes a trading station where a trader can submit bids and offers for a tradeable object being traded at more than one electronic exchange.

FIG. 2 illustrates another example trading system that uses similar computer elements as shown in FIG. 1, in which the example embodiments may be employed to trade at multiple electronic exchanges. The system comprises a trading station 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread trade, as will be described in greater detail below, different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, trading stations, routers, or other computers serving various functions like message handling and security). Additionally, several networks, like either of the networks shown in FIG. 1 or FIG. 2, may be linked together to communicatively access one or more electronic exchanges.

IV. An Example Trading Station

Figure 3:
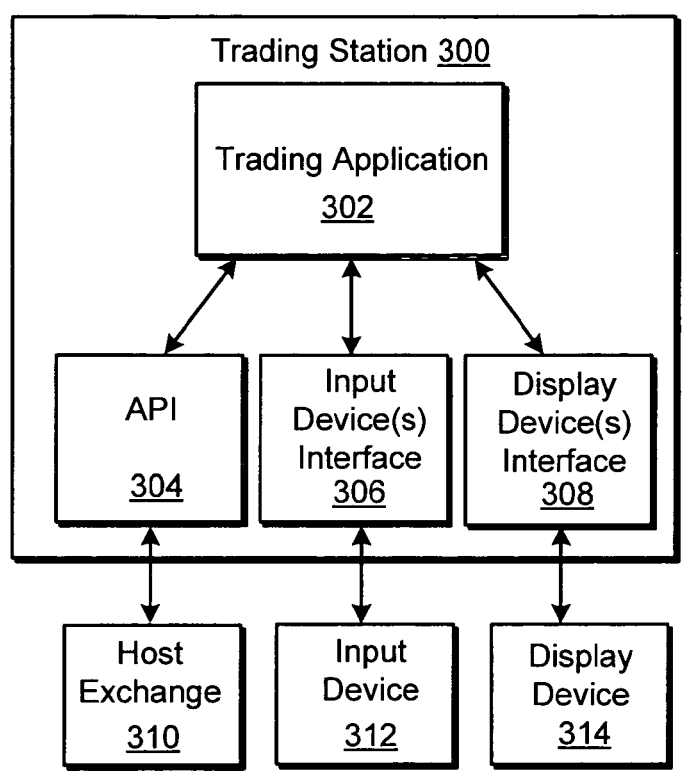
FIG. 3 illustrates an example trading station 300 where a user can submit bids and offers for a tradeable object being traded at one or more exchanges.

FIG. 3 shows an overview of a trading station 300 which is similar to the type of trading stations 102 and 202 shown in FIGS. 1 and 2. Trading station 300 can be any particular type of computing device, examples of which were enumerated above. According to one example embodiment, trading station 300 has a trading application 302 stored in memory that when executed arranges and displays market information in many particular ways, usually depending on how the trader prefers to view the information. Trading application 302 may also implement an automated trading tool such as the automated spread trading tool that automatically sends orders into underlying legs to achieve a spread. Additionally, the example embodiments for regulating and managing order entry may be part of trading application 302. Preferably, trading application 302 has access to market information from one or more exchanges 310 through API 304 (or application programming interface), and trading application 302 can also forward transaction information to exchange 310 via API 304. Alternatively, API 304 could be distributed so that a portion of the API rests on the trading station 300 and a gateway, or at the exchange 310. Additionally, trading application 302 may receive signals from input device 312 via input device interface 306 and can be given the ability to send signals to display device 314 via display device interface 308.

Alternatively, the example embodiments described herein may be a separate program from trading application 302, but still stored in memory and executed on the trading station 300. In another alternative embodiment, the preferred embodiments may be a program stored in memory and executed on a device other than trading station 300. Example devices may include a gateway or some other well known intermediary device.

V. Automatic Spread Trading Overview

The example embodiments describe methods for placing orders related to spread trading strategies by an automated spread trading tool. However, the example embodiments described herein are not limited to automated spread trading tools, and could be applied in relation to different automated trading tools. For example, another type of trading tool that has an automated order entry system and may benefit using the preferred embodiments is described in U.S. patent application Ser. No. 10/284,584, filed on Oct. 31, 2002 and entitled, "System and Method for Automated Trading," the contents of which are incorporated herein by reference. Also, the example embodiments are not limited to spreads, and could be easily used in relation to different trading strategies as well. The automated trading tools may be located at the trading station, a server, or even at an exchange. If located at placed other than the trading station, the automated trading tools could be still controlled using the API at the trading station. One skilled in the art of trading may readily adapt the example embodiments to work with this type of automated trading tool, or yet some other type of trading tool or trading strategies, using the teachings described herein.

To assist in understanding how an automated spread trading tool might work, a general description is provided below. However, an automated spread trading tool and its functions are described in greater detail in U.S. patent application Ser. No. 10/137,979, filed on May 3, 2002 and entitled, "System and Method for Performing Automatic Spread Trading," fully incorporated herein by reference.

According to one embodiment of an automated spread trading tool, a trader can select two or more individual tradeable objects, "legs," to create a synthetic spread that is sometimes referred hereinafter interchangeably as a spread. The automatic spread trading tool preferably generates spread data based on information in the legs and based on spread setting parameters, which are configurable by a user. The spread data is communicated to a graphical user interface where it is displayed in a spread window, and where data corresponding to the legs of the spread may be displayed as well. At the client terminal, the user can enter orders in the spread window, and the automated spread trading tool will automatically work the legs to achieve, or attempt to achieve (because the fill of the order is not always guaranteed) a desired spread.

Figure 4:
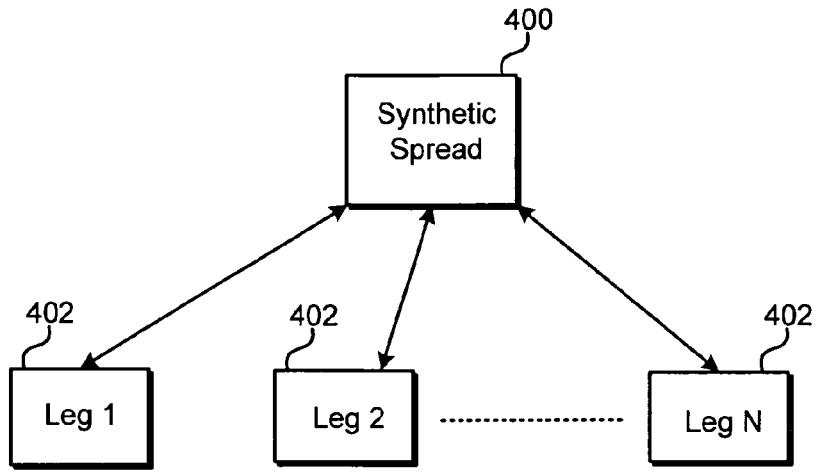
FIG. 4 illustrates an example relationship between a synthetically created spread and its underlying "N" number of legs.

FIG. 4 illustrates the relationship between a synthetically created spread 400 and its underlying "N" legs 402, where N can be any number greater than 1. For example, a spread might have two legs, three legs, four legs, and so on. Generation of the spread 400 may be based on relationships that exist between the legs 402. Some relationships which might be used are described in the above incorporated U.S. patent application Ser. No. 10/137,979. Also, one skilled in the art of trading may have their own relationships which they prefer to use. It is not necessary to know these relationships, however, to understand the example embodiments.

Figure 5:
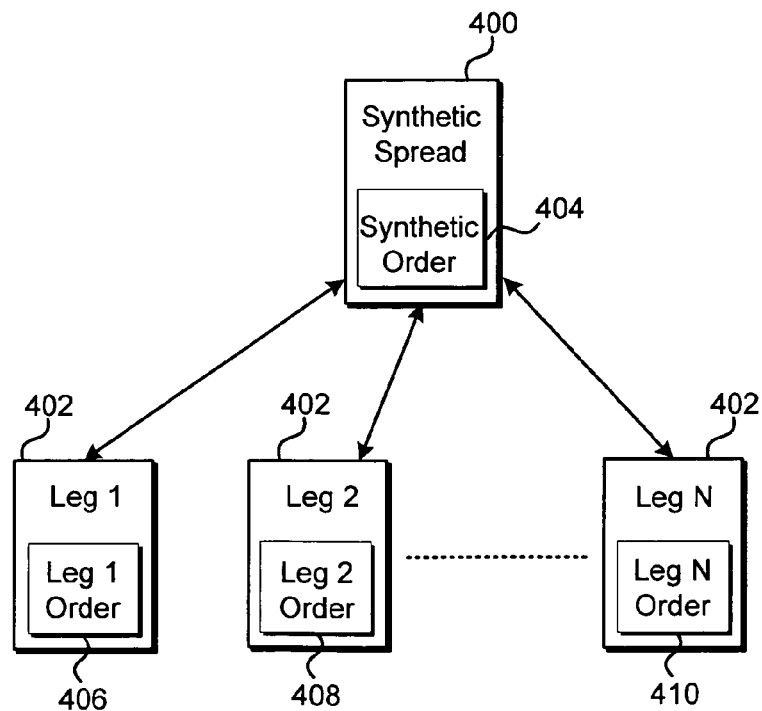
FIG. 5 illustrates the same relationship between spread and its underlying legs as in FIG. 4, except that a synthetic spread order has been placed.

FIG. 5 illustrates the same relationship between synthetic spread 400 and its underlying legs 402 as in FIG. 4, except that a spread order 404 has been entered. When a trader enters an order to buy or to sell the spread (e.g., spread order 404) in a synthetic market, the automated spread trading tool automatically places orders in the appropriate legs to achieve or attempt to achieve the desired spread 404. For example, to achieve synthetic spread order 404, the automated spread trading tool may automatically enter orders 406, 408, . . . 410 into the underlying legs 402 (e.g., "Leg 1," "Leg 2," . . . "Leg N"). The automated spread trading tool may, among other things, calculate the quantities and prices for the orders 406, 408, 410 based on market conditions in the other legs and one or more parameters. For example, according to one trading strategy, consider if "Leg 1 Order" 406 is a buy order, then the price of order 406 may be based on the best bid price of "Leg 2" and on the best bid price of each leg through "Leg N." Of course, depending on the trading strategy, the price of order 406 might be based only on some of the legs and not on all N legs. Alternatively, other trading strategies may be used to determine the price and quantities of the orders. For example, the price of buy order 406 may be determined based on the best ask price of "Leg 2" and on the best ask price of each leg through "Leg N" (or on only some of the N legs). Of course, the order parameters of an order in one leg can be based on other types of market conditions in the other legs such as the last traded price (LTP), the last traded quantity (LTQ), a theoretical value, or some other reference point.

When the leg orders are generated by the automated spread trading tool, the leg order may be routed to one or more exchanges, depending on where the tradeable objects defined for the spread are traded. If the orders are not filled right away when they are received at the exchange(s), the orders are forwarded to a matching process and placed in order queues corresponding to the prices of each leg order.

According to the example embodiments, as the market conditions for each leg move, an effective spread order price may be calculated. For example, if market conditions for "Leg 1" change, then an effective spread order price associated with order 404 may be determined to reflect the new market conditions. Similarly, if market conditions for "Leg 2" change, then an effective spread order price associated with order 404 may be determined. Using a conventional automated spread trading tool, if the effective spread order price is different from the desired spread order price, then the automated spread trading tool would move or re-price the leg orders in an exchange order book to maintain the desired spread order price. In particular, the leg order(s) would be deleted from the exchange(s), and new leg order(s) would be sent to the exchange to maintain the desired spread price. There are other ways to change an order which may provide similar results, such as sending a change order request message to an exchange at which the order was placed, etc.

Alternatively, effective prices of spread orders can be calculated continuously. For example, the effective spread order prices can be calculated every second or yet using some other time interval. According to this alternative approach, it is not necessary to monitor changes in market conditions before an effective spread order price is calculated. Similarly to the above embodiment, however, using a conventional automated spread trading tool, if the effective price of the spread order is different from the desired price of the spread order, then the automated spread trading tool would move or re-price the leg orders in the order book(s) of one or more exchanges to maintain the desired spread price being sought.

In an alternative embodiment, rather than calculating an effective spread order price, the automated spread trading tool could calculate effective prices of orders in each leg of the synthetic spread. In particular, as the market conditions for each leg move, the effective prices of orders in the other legs may be calculated such that the desired spread price being sought by the trader can be maintained. For example, if market conditions for "Leg 1" change, then the effective prices of orders based on the market conditions in "Leg 1," such as order 408 through order 410 may be calculated to maintain the spread. If market conditions for "Leg 2" change, then the effective prices of orders based on market conditions in "Leg 2," such as order 406 through order 410 may be calculated to maintain the desired spread price. Further, to maintain the desired spread price being sought, using a conventional automated spread trading tool, if the effective prices of the leg orders are different from the prices of the leg orders, then the automated spread trading tool would move or re-price the leg orders in an exchange order book. In particular, the leg order(s) would be deleted from the exchange, and a new leg order(s) at the effective price would be sent to the exchange.

VI. Queue Holder Overview

According to the spread trading systems described above, when market conditions corresponding to one or more legs of a predefined synthetic spread change, one or more leg orders are re-priced in an exchange order book to achieve a desired spread price. Such a system, however, requires cancellation or change of the existing leg order(s) and placement of one or more new leg orders, thus, causing placement of the new order at the end of an order queue corresponding to a new price of the leg order.

Example system and associated methods described herein provide means for intelligent placement and movement of orders within a range of prices. Using the described methods a trader may potentially get a more favorable queue position for spread leg orders when changes in the market corresponding to the leg order cause re-pricing of one or more leg orders. More specifically, according to the example embodiments described below, in addition to submitting a leg order at a calculated price level, additional orders at prices either below or above the calculated price level are submitted as well for the same leg to ensure a better queue position for the future re-priced orders. According to such an embodiment, if the market changes such that it is necessary to re-price either or both leg orders, the leg orders at the initially calculated prices may be deleted, and there will be already leg orders resting at the re-calculated leg order prices. Thus, one advantage of the example methods is that the re-priced leg orders will have better queue positions as compared to the orders that would be submitted upon detecting a re-price command in response to changing market conditions. Also, the example methods may result in more fills and fewer orders getting legged up. It should be understood that additional advantages will be apparent to those skilled in the art as well based on the description provided below.

A. Placement of a Leg Order

Figure 6:
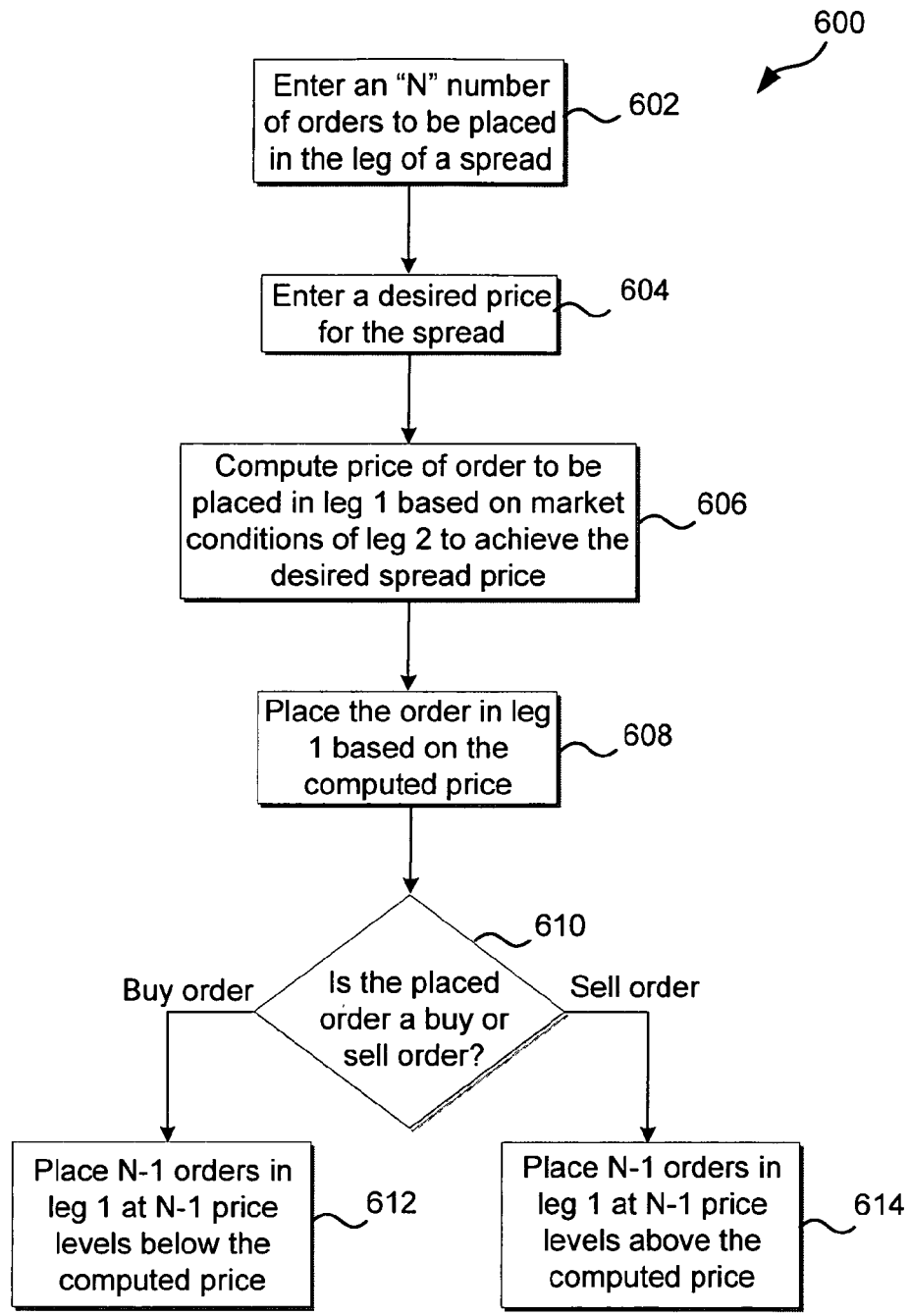
FIG. 6 illustrates a data flow diagram that demonstrates an example method for order placement according to one example embodiment.

FIG. 6 is a flow diagram illustrating an example method 600 for order placement according to an example embodiment. It should be understood that each block in this and each subsequent flowcharts may represent a module, segment, or portion of code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the present invention.

The flow diagram 600 provides an example queue holder mechanism that can be used to intelligently provide or attempt to provide more favorable queue positions for trader's orders. The example method 600 is described in relation to a spread strategy having two legs. However, the method 600 could also be used in relation to different orders or trading strategies as well.

At step 602, a user defines an "N" number of orders to be placed in a leg of a synthetic spread. According to one example embodiment, "N" is an integer and represents a number of price levels other than the calculated price level to be used in relation to an outright leg order, the first spread leg order, in this example. It should be understood that the same or different values of "N" could be used for each leg of the spread based on the user preferences. A trader could define "N" prior to trading or at any time during trading a spread. Also, "N" could be based on one or more user-defined equations, and could dynamically change based on predefined conditions.

At step 604, the user defines a desired price for a spread order. In addition to defining the desired price, the user could also define other order parameters, such as a desired spread order quantity. At step 606, in response to receiving spread order parameters, an automatic trading tool, such as an auto-spreader, in this example, computes a price for an order to be placed in the first leg of the spread, "leg 1." As described earlier, the price for the order of the first leg is computed based on market conditions of the second leg, "leg 2," to achieve the desired spread price. Also, the "leg 1" order could be either a buy order or a sell order based on whether the spread order was a buy or sell, and further based on the spread configuration. At step 608, the automated trading tool places the order for "leg 1" at the computed price at an electronic exchange. According to the example embodiment, placing the order involves sending the order to a matching process located at the electronic exchange.

At step 610, the trading tool determines if the order placed in "leg 1" of the spread was a buy or sell order. If the placed order was a buy, at step 612, the automated trading tool places "N−1" orders in the first leg of the spread at "N−1" price levels below the computed price. If the placed order was a sell order, at step 614, the automated trading tool places "N−1" orders in "leg 1" of the spread at "N−1" price levels above the computed price. It should be understood that, according to one example embodiment, the prices below or above the computed prices corresponding to the "N−1" orders are preferably consecutive prices. According to another example embodiment, some "N−1" prices could be consecutive prices, while there could be price gaps between other prices corresponding to other "N−1" orders. The prices for the "N−1" orders could be alternatively determined based on a preset formula having one or more market condition based variables.

Further alternatively, if there is not enough quantity at some price levels, "N" could be dynamically changed to ensure fill of the spread order. For example, if "N" were set to 2, and there were not enough quantity at the "N−1" price level, "N" could be dynamically modified to 3 or yet some other number to ensure the potential fill of the leg order if the leg order had to be re-priced to the "N−1" level. It should be understood that different embodiments are possible as well. It should be understood that automatic modification of "N" could be based on different variables as well. Also, while the method 600 was described in relation to one spread leg order, the same method could be applied to other spread legs as well.

B. Re-Pricing the Leg Order

As mentioned earlier, when market conditions corresponding to leg orders change, the automated spread trading tool has to re-price one or more leg orders to new prices to achieve a desired spread order price. However, according to the example embodiment described in reference to FIG. 6, when the automated spread trading tool is to cancel or change the existing leg order and replace it with a new order, there will be already a leg order resting at the new re-calculated leg order price. Cancellation or change of the current leg order will also cause placement of one or more additional orders at additional price levels to maintain a desired number of leg orders, "N" in these examples, one method of which will be described in the following figure. As used herein, order cancellation may be accomplished by either sending a cancellation request, or if the order is being replaced with another order, sending a change command. It should be understood that the means that is used for changing an order may be dependent on what options are allowed by an exchange.

Figure 7:
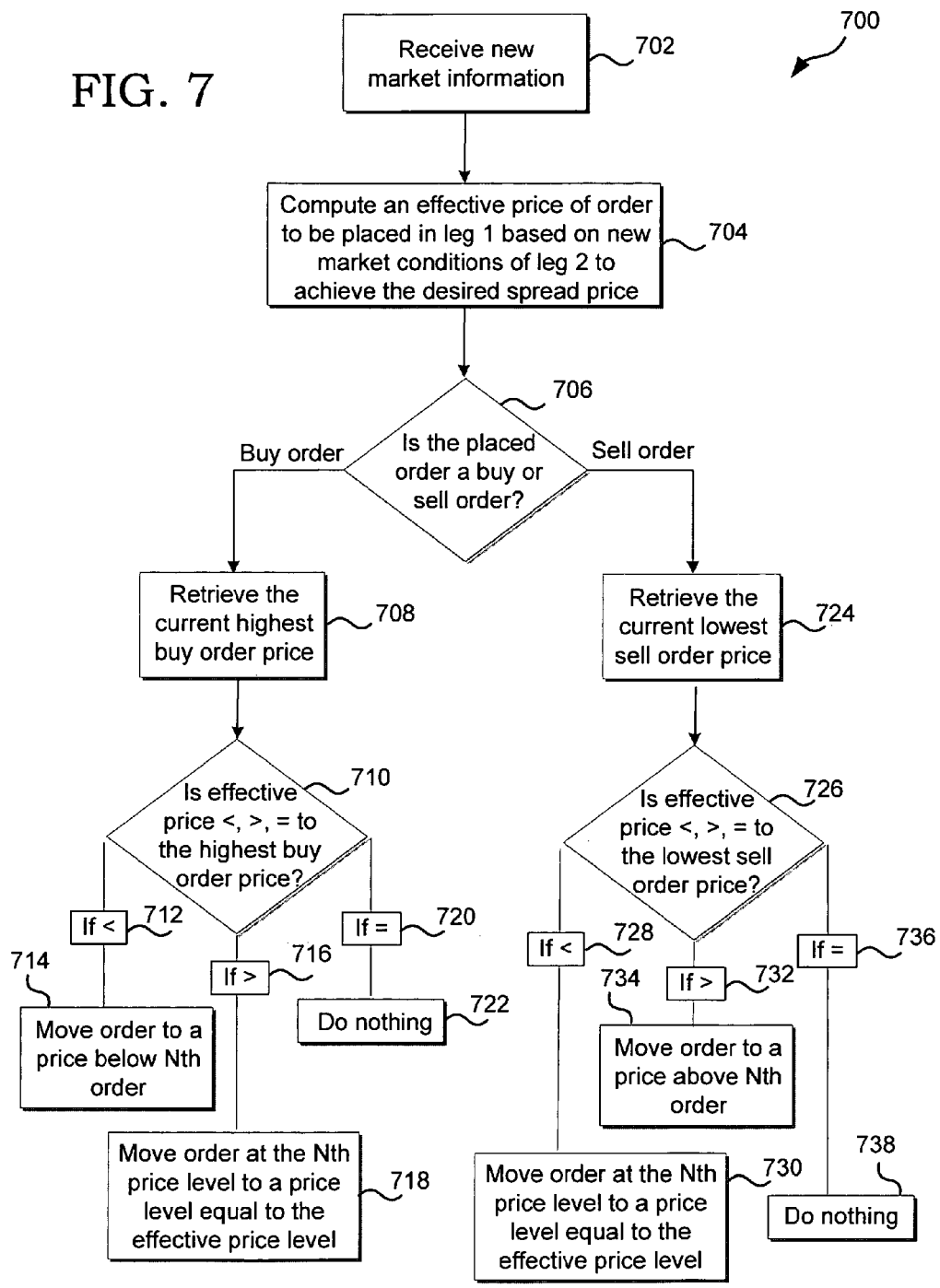
FIG. 7 illustrates a data flow diagram that demonstrates an example method for re-pricing a spread leg order according to one example embodiment.

FIG. 7 is a flow diagram illustrating an example method 700 for re-pricing a spread leg order according to one example embodiment. The method 700 is a continuation of the method 600 where "N−1" leg orders at "N−1" price levels were placed in relation to "leg 1" order.

At step 702, new market information is detected for a tradeable object corresponding to one or more spread leg orders, such as a tradeable object corresponding to "leg 2" in this example. At step 704, the automated spread trading tool computes an effective price of an order to be placed in "leg 1" based on the new market conditions of "leg 2" and to achieve a desired spread price.

At step 706, the automated spread trading tool determines if the order corresponding to "leg 1" is a buy order or a sell order. If the order is a buy order, the method continues at step 708, where the automated trading tool retrieves the current highest buy order price among all "N" buy orders placed for "leg 1." At step 710, the automated spread trading tool determines if the effective order price computed for "leg 1" is lower, higher, or equal to the highest buy order price corresponding to "leg 1." If the effective order price is lower than the highest buy order price among "N" orders placed for "leg 1," the order at the highest buy order price is moved to a price level below the N-th price level, where the N-th price level is the price level furthest away from the highest buy order price. The movement of an order includes cancellation of the leg order at the highest buy order price, and placement of an order at a price below the N-th price level. Alternatively, depending on user-selected order management method, the movement of an order may include changing the leg order at the highest buy order price to the price below the N-th price level. It should be understood that, if the effective order price moves by more than one tick, more than one order could be moved according to the example embodiments to maintain "N" orders for the leg.

Referring back to step 710, if the effective order price for "leg 1" is higher than the highest buy order price, as shown at step 716, the automated spread trading tool moves the order at the N-th price level to a price level equal to the effective price level. The movement of the order in this embodiment involves cancellation of the order at the N-th price level and placement of a new order at the effective order price. As explained earlier, if the effective price changes by more than one tick, more than one order would be moved according to the example embodiments to maintain "N" orders for the leg. Referring back to step 710, if the effective order price is equal to the highest buy order price, all "N" orders for "leg 1" are maintained at their current price levels, and no action is taken.

Referring now back to step 706, if the submitted leg order is a sell order, at step 724, the automated spread trading tool retrieves the current lowest sell order price corresponding to the first of the "N" orders submitted for "leg 1." Then, at step 726, it is determined if the new effective leg order price is lower, higher, or equal to the lowest sell order price. At step 728, if the new effective order price is lower than the lowest sell order price, the automated spread trading tool may move the order at the N-th price level to a price level equal to the new effective price level. Similarly to the embodiments described above, the movement of the order involves cancellation of the order at the N-th price level, and placement of a new order at the new effective price level. Also, if the effective price level changes by more than one tick, more than one order could be moved to new price levels.

Referring to step 724, if the new effective price level is higher than the lowest sell order price, as shown at 732, the order at the lowest sell order price is moved to a price level above the N-th order. More than one order could be moved based on the changes of the tick differential between the effective price level and the lowest sell order price. Finally, at step 736, if the new effective order price is equal to the lowest sell order price, no action is taken.

While not shown in FIG. 7, it should be understood that when a leg order gets filled the remaining "N−1" queue holder orders may be cancelled immediately to avoid any unwanted fills. Alternatively, a trader may define a trading strategy to include two spread orders having identical or slightly different desired spread prices. In such an embodiment, rather than deleting the remaining queue holder orders, the orders can be used in relation to the second or even third spread trading strategy. For example, if the desired spread prices of two spread orders using the same queue holder order are slightly different, upon completing the first spread strategy, some of the remaining queue holder order could be reused for the second spread strategy, while adding one or more new queue holder orders, based on the settings defined for the queue holder orders.

C. Spread Configuration Window

FIG. 8 is a block diagram illustrating an example spread setup configuration window 800 that can be used by a trader to define a spread. The configuration window 800 shows an embodiment where a user can configure parameters for a spread having two legs. However, it should be understood that the example embodiments are not limited to spreads having two legs, and similar interfaces could be used to configure spreads having more than two legs as well.

The leg icons 802 and 804 provide status indicators for each leg of the spread. For example, the status indicators could be color coded to indicate a status corresponding to a tradeable object of each leg. For example, the icons 802 and 804 can be disabled when a connection to an exchange providing a tradeable object defined for a leg has not been established. For example, one color, such as gray, could be used to indicate that no attempt has been made to activate a tradeable object for trading, a different color, such as yellow, could be used to indicate that the system is still waiting for response after attempting to activate the tradeable object for trading, and green could be used to indicate a successful activation of the tradeable object for trading.

The spread set up configuration window 800 includes a number of fields 806-812 that can be used to enter information related to a tradeable object in each leg of the spread. The information in each of the respective fields could be either entered manually or could be copied from another window interface, such as by dragging and dropping the information to the set up configuration window 800. The "Gateway" fields 806 under each leg icon 802 and 804 can be used to specify a name of a gateway to be used to receive information related to each respective tradeable object. The "Gateway" fields could be automatically populated upon selecting a tradeable object for each leg of the spread. The "Product" fields 808 are used to define a general category of tradeable object, such as ZF, ZN, or yet some other product available at electronic exchanges. The "Product Type" fields 810 can be used to define a type of the product, such as futures, interest rates, etc. As shown in FIG. 8, a drop down menu could be provided to allow selection of different product types. Finally, the "Contract" fields 812 can be used to define contract identifiers, or product names. For example, when the product field includes a future product, the "Contract" field 812 could specify the closing date corresponding to that tradeable object, such as Sep05.

The spread set up configuration window 800 also includes additional fields that can be used to define a plurality of adjustable parameters. "Customer Account" field 814 can be used to select a customer account to be used for trading a tradeable object corresponding to each leg of the spread. According to one example embodiment, the selection choices in the pull down menu of the Customer Account fields could be automatically populated based on data available from some other applications, such as an application that a trader uses to log onto an exchange. "Spread Multiplier" fields 816 can be used to define values for use of calculating spread prices. "Order Size" fields 818 define the quantity for each leg order. The plus and minus signs in relation to the defined quantities could be used to define if a leg order is a buy order or a sell order, respectively.

"Queue Holder" fields 820 can be used to enter the number of levels (order levels) to be submitted for each leg, as was described in greater detail above. "Volume Multiplier" fields 822 allow a user to enter a value to be used by the automated spread trading application to calculate needed volume for a leg before an order corresponding to that leg is placed at a specific price level. According to one example embodiment, the volume calculations could be based on the following formula: (Hedge Size*Volume Multiplier+Base Volume), where the volume multiplier and the base volume variables could be user configurable. For example, if a hedge size is 7, the minimum quantity of 7 would be normally needed if the volume multiplier was set to 1 and the base volume was set to 0. Then, assuming that the volume multiplier was set to 5 with the base volume set to 0, the needed volume at a price would have to be 35 before the order would be placed at that price. Then, for example, with the volume multiplier set to 5 and the base volume set to 25, the available quantity at a price would have to be 60 (7*5+25) before placing an order at that price.

A user could also define additional parameters to be used for preventing continuous re-quoting of leg orders associated with the synthetic spread. To do that, the user could enter a tick value in "Inside slop" 824A and "Outside slop" fields 824B. The tick value defined in "Inside slop" and "Outside slop" fields 824A and 824B can then be used to determine an acceptable range for the effective price of the leg order. In such an embodiment, if the effective price of the leg order falls within the acceptable range, the auto-spreader application does not re-price order. However, if that price falls outside the acceptable range, the leg order will be re-priced to the new effective price level.

"Inside Anti-Slop" and "Outside Anti-Slop" fields 826A and 826B can be used by a trader to define a number of ticks to be used in relation to the anti-slop functionality. In general, the anti-slop, when used, enables a trader to have his/her orders re-quoted when the effective order price of an order falls close to the current market, i.e., within a predefined range away from the current inside market or yet some other reference point. Using an inside anti-slop, an order would be re-quoted if the result of the re-quoting would put the order at a price level within a predefined range away from the inside market. Using an outside anti-slop, an order would be re-quoted if a price corresponding to the order before the order is re-quoted falls within a predefined range away from the inside market.

For example, if the inside anti-slop 826A is set to 4, with the inside market being used as a reference for a starting point of a range, an order will be re-quoted only if the order's new price will fall within 4 price levels from the inside market. Then, if the outside anti-slop 826B is set to 4 while the inside market is still being used as a reference point, if a price corresponding to an order before the order is being re-quoted falls within 4 price levels from the inside market, the order will be re-quoted to a new price. Similarly to the slop, the anti-slop could be used by a trader to reduce the number of times an order is re-quoted based on changing market conditions.

The queue holder functionality of placing "N" orders for each leg could be manually or automatically disabled based on one or more conditions. Using the set up window 800, a user could use "Auto Break" fields 828 to define a maximum number of ticks a price can move in a single update before the market is deemed to be too volatile for use of the queue holder functionality. However, it should be understood that different conditions could be applied as well, and some conditions could be based on a user-defined equation having one or more predefined variables.

The set up window 800 may also display current market conditions for the tradeable objects corresponding to each leg of the spread. The extent of the market information can be user-configurable. The set up window 800 includes "Best Bid" 830, "Best Ask" 832, and last traded price "Last" 834. However, it should be understood that additional market related parameters could be provided as well, and the example embodiments are not limited to the shown variables.

A trader could also define actions to be taken in relation to each leg of the spread. For example, as shown in FIG. 8, a trader could activate "Active Quote" fields 836 with respect to each leg of the spread. When active quoting is activated for a spread leg, an order may be submitted to that leg, and the leg order will be re-quoted based on market changes in the other leg(s) of the spread. Once the leg order gets filled, an offset order is sent to the other leg. It should be understood that active quoting could be activated and used simultaneously in relation to two or more leg orders defined for a spread. The set up configuration window 800 also includes "Cancel/Replace" fields 838 that can be activated by a trader to indicate the mode of order entry in relation to N queue orders. If the "Cancel/Replace" fields 838 are not activated, a different mode, such as an order change, could be used.

"Hedge Down" fields 840 can be activated so that the automated spreader application can do partial fill hedge quantity calculations by rounding the quantity down. For example, when the "Hedge Down" 840 is activated, in relation to a 10:1 spread, and a quantity of 7 has been filled in relation to a first leg of the spread, no hedge (offset) order would be sent to the second leg of the spread until the entire quantity of 10 is filled. If the fields 840 are not activated, default parameters, such as rounding hedge quantities on partial fills, or yet some other functionality, could be used as well. Referring back to the above example, but now using the rounding functionality, if the quantity of 7 is filled on the first leg of the spread, a hedge order having an order quantity of 1 would be sent to the second leg of the spread, with no action taken when the remaining quantity of 3 is finally filled. Different embodiments are possible as well.

The spread configuration window 800 also includes a spread calculation pull down menu 842 that can be used by a trader to select a basis for calculating spread related prices. For example, as shown at 842, a trader could select implied prices as the basis. However, different embodiments are possible as well, such as using a net change or divide that divides prices corresponding to one leg of the spread by prices of the other leg to be used as the basis in the spread price calculations. It should be understood that different embodiments are possible as well.

D. Order Ticket Window

According to one example embodiment, a trader could configure and submit synthetic spread orders via an order ticket window. As will be described in greater detail below, different order entry mechanisms could be used as well, such as submitting a synthetic spread order directly through a market depth trading window.

Figure 9:
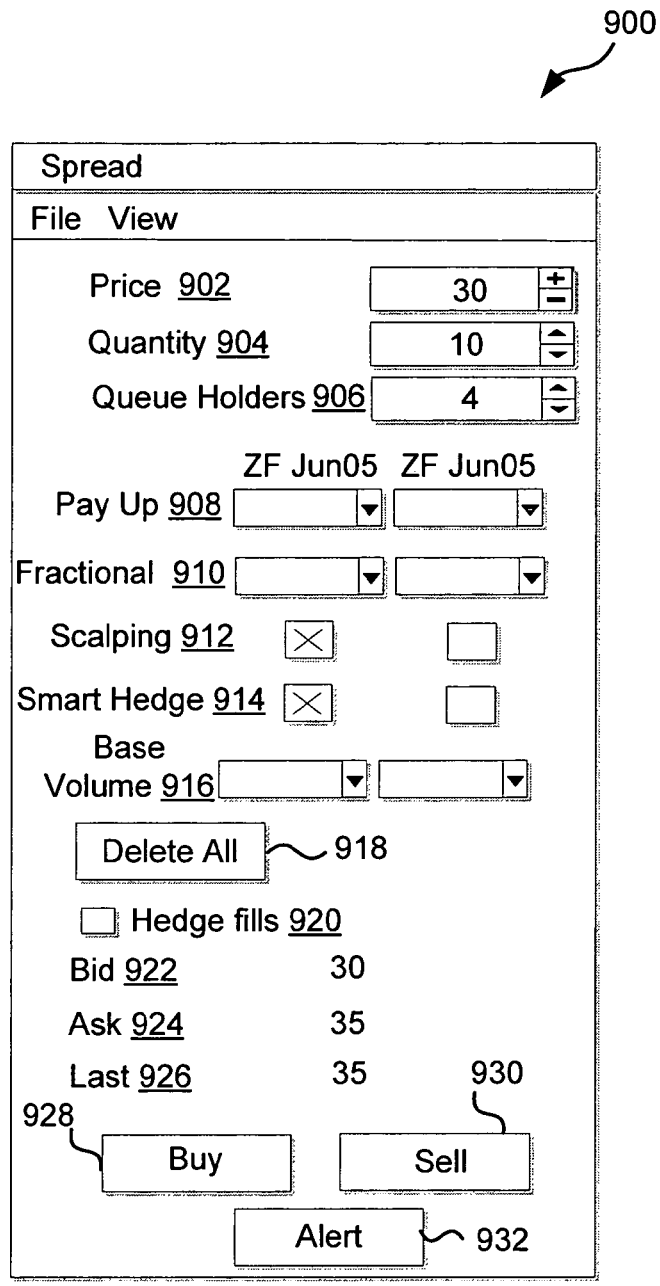
FIG. 9 illustrates an example block diagram of an order ticket that can be used to enter spread orders according to one example embodiment.

FIG. 9 is a block diagram illustrating an example order ticket 900 that can be used to enter spread orders according to one example embodiment. The order ticket 900 can be user configurable, and a trader could save different order tickets under different workspaces that could be activated based on the trader's preferences.

The order ticket 900 includes a price field 902 that can be used to define a desired price for a synthetic spread. A user could adjust the price value using the plus and minus buttons. Also, the value in the price field 902 can be automatically populated based on a predefined formula. According to one example embodiment, based on the price entered in the price field 902, "Buy" and "Sell" buttons 922 and 924 can be disabled to ensure that spread submission does not cross the market. For example, if a current best bid for a spread is at 99, and a price entered in the price field 902 is 100, the "Buy" button could be disabled to prevent a trader from entering an order that would cross the current market. A trader could override the crossing the market limitation by making a predetermined selection input, such as selecting one or more predefined keys.

"Quantity" field 904 allows a trader to enter a desired number of spreads to be bought or sold. According to one example embodiment, a quantity tool tip could be used to provide a user with the current state of the queue holder, such as "working," "done," "ready," etc. "Queue Holders" field 906 can be used to define a number of price levels (orders) to be submitted for each leg. If all legs of the spread have the same number of queue holders, as defined in relation to FIG. 8, the queue holder value at 906 could reflect the defined value. Also, if the same value was defined for both legs of the spread in relation to FIG. 8, a user could overwrite that value by defining a new queue holder number in the field 906.

The order ticket 900 also includes "Pay Up Tick" fields 908 that allow a trader to define pay up ticks to be used in relation to each hedge order submitted for each leg of the synthetic spread. Each value in the "Pay Up" field defines the number of ticks that a trader is willing to pay beyond the basis of the limit price to complete a spread, or, in other words, an acceptable range of prices for the offset order. In one example embodiment, the basis price of the limit order may be based on a price that will achieve the desired spread price. Alternatively, the basis price for limit orders could be based on the inside market (either the best offer in the case of a bid or the best bid in the case of an offer).

Using the pay-up ticks, a price for a limit order may be established by adding the pay-up tick value to the basis of a buy order and subtracted from the basis of the sell order. In other words, the pay-up ticks allow a trader to set a level of tolerance with respect to getting an order filled. According to one example embodiment, a trader could define the pay up ticks to be negative or positive. The order ticket 900 also includes "Fractional Negative Pay-Up Ticks" fields 910, a "Scalping" field 912, and a "Smart Hedge" field 914, each of which will be described below in the "Additional Trading Tools" section.

"Base Volume" fields 916 allow a user to dynamically adjust the base volume for each tradeable object corresponding to a leg of the spread. According to one example embodiment, the base volume can be used to determine a minimum quantity that is required in an appropriate offset queue in order for the spread to be quoted there. It should be understood that the base volume could be set manually or automatically based on a user-defined equation. The required volume can then be calculated using the formula described in greater above: (Order Size)*(Volume Multiplier)+(Base Volume). However, different formulas could be used as well. In the provided example, a trader could define any value to be used as the volume multiplier variable.

A "Delete All" field 918 allows a trader to clear all settings entered via the order ticket 900. "Hedge Fills" 920 can be used to activate sending of a hedge order when one leg is filled. When the "Hedge Fills" field 920 is disabled, orders can still be quoting in the market; however, if an order is filled, a hedge order is not submitted. This functionality may be useful when a trader wants to place an offsetting order manually, because the trader, for example, believes that the market is moving in the favorable direction, and the trader may make an extra profit by submitting the offsetting order manually as compared to an order that would be placed automatically by the spread trading tool. Also, it should be understood that the hedge fills functionality can be controlled automatically based on the user-defined formula (s). For example, certain conditions may be used to deactivate hedging of orders.

The order ticket 900 also indicates the current state of the market corresponding to the spread. "Bid," "Ask," and "Last" fields 922, 924, and 926 indicate the calculated spread prices. It should be understood that different methods could be used to calculate the spread related data, all of which are commonly known in the art. The values in each of these fields could be automatically populated from an application that computes spread related data based on market data corresponding to a tradeable object of each leg defined for the spread.

A trader could select a "Buy" icon 928 or a "Sell" icon 930 to indicate if the spread is a buy or a sell. It should be understood that the order ticket 900 could include additional selection options and is not limited to the illustrated parameters. The order ticket 900 also includes an alert selection icon 932 that can be used by a trader to select one or more events that could trigger an activation of an alert. The events could be based on the market, trader's performance, or yet some other criteria. Also, a trader could select from a number of alert options, such as a sound alert, a visual alert, or a combination thereof.

VII. Additional Trading Tools

A. Fractional Pay-Up Ticks

As described above, an automated spread trading tool may compute an order price for one leg based on market conditions of a second leg. When the order in the first leg fills, the spread trading tool automatically sends an order to the second leg. The price of the order in the second leg is usually set to a market price so that the order in the second leg can get filled immediately or soon after placement. Sometimes a trader will use pay up ticks to provide further assurance that the second order will get filled as soon as possible, thereby completing the spread. In other words, if the market changes in the second leg before the second order actually gets placed at the exchange, the trader may have missed an opportunity. By using pay up ticks, the trader is willing to "give up" a certain number of ticks to get the second order filled.

There may be some instances when a trader wants the offsetting order to get filled, but is also willing to take some risk to get a more desirable fill price for the offsetting order. To do so, the trader may use fractional pay-up ticks. Fractional pay-up ticks divides the offsetting order quantity according to certain percentages. Then, a portion of the offsetting order quantity will be placed at one price, such as the market price (or the original price set for the offsetting order), and the other portion(s) will be placed at other price levels (e.g., at more desirable prices or even a less desirable prices if so programmed and the market moves accordingly). As an example, "Fractional Negative Pay-Up Ticks" fields 910 are shown in relation to FIG. 9. It should be understood that the use of fractional pay-up ticks is not limited to the use with spread orders that use the queue holder functionality.

A trader could use the functionality of the fractional negative/positive pay-up ticks to hedge a preset fraction of a offsetting leg order's quantity using predefined negative or positive pay-up ticks, while the remaining offsetting leg order's quantity will be submitted at an effective spread leg order price or yet another pay up tick defined for the leg order. It should be understood that the fractions to be used in relation to each leg order could be dynamically set based on user-defined formulas. The variables in the formulas could be based on market conditions, or user risk related data, such as a current profit level, a net position, or yet some other conditions. It should be understood that fractional pay-up ticks could be defined for each leg of the spread.

To illustrate one example embodiment how the fractional negative pay up ticks could be used, let's assume that a trader defines a synthetic spread with an order quantity of 10, a spread ratio 1:1, a desired spread price of 0, and both legs ticking in 1's. In relation to the pay-up tick configuration, let's assume that the pay-up tick value for the spread is set to 1, with the fractional ratio set to 61%, and the fractional pay-up tick value set to −1. Upon entering a spread buy order, let's assume that a spread trading tool placed a buy order having a quantity of 10 at 100 for "leg 1" of the spread, and the buy "leg 1" order was filled. Normally, with no pay-up ticks defined, the spread trading tool would attempt to sell the quantity of 10 at 100 for "leg 2" to achieve the desired spread price of 0. With a pay-up tick set to 1, a trader is willing to "pay" an extra tick in order to get the spread, so the sell order for "leg 2" having an order quantity of 10 would be placed by the spread trading tool at the price of 99.

However, because the fractional pay-up ticks are used, only a portion of the quantity of 10 will be submitted at the price of 99. The spread trading tool may use the fractional ratio of 61% to calculate a fractional pay-up tick quantity, in this example 6.1 (0.61*10) that can be rounded down to 6 (it should be understood that the rounding mechanism could be user-configurable). Thus, using the fractional pay-up ticks applied in this example, the quantity of 6 would be submitted with a first sell "leg 2" order, a fractional hedge order, at 101 (100−(−1)), and the quantity of 4 would be submitted with a second sell "leg 2" order at 99 (100−1).

To illustrate another example embodiment, let's assume that a trader defines a synthetic spread having the same spread settings, i.e., the quantity of 10, the spread ratio of 1:1, the desired spread price of 0, and both legs ticking in 1s. In relation to the pay-up tick configuration, let's now assume that the pay-up tick value for the spread is set to 2, with the fractional ratio set to 39%, and the fractional pay-up tick set to 3. Let's also assume that the synthetic spread order was a sell order, and that a sell spread order for "leg 1" having an order quantity of 10 at the price level of 100 was entered and got filled. As explained in the preceding example, if no pay-up ticks were defined, the spread trading tool would attempt to buy the quantity of 10 at the price of 100 for "leg 2" of the spread. With a pay-up tick set to 2, a trader is basically willing to pay extra 2 ticks in order to get the spread, so the spread trading tool would enter a buy order having an order quantity of 10 at the price of 102 for "leg 2." However, once again, because fractional pay-up ticks are used, the quantity corresponding to "leg 2" will be divided based on the fractional ratio. Based on the fractional ratio, 39%, in this example, the trading tool would submit two buy orders for "leg 2," with the first buy order, a fractional hedge order, having the quantity of 3 (0.39*10=3.9 with the rounding down enabled) at the price of 103 (100+3), and the second buy order having the quantity of 7 at the price of 102 (100+2).

It should be understood that the above examples are only illustrations, and the fractional pay-up ticks' functionality is not limited to the provided examples. For example, fractional pay-up ticks could be used in relation to synthetic spreads having more than two legs.

B. Scalping

The order ticket 900 also includes a "Scalping" field 912 that can be activated by a trader for each spread leg order. When the "Scalping" field 912 is selected and one of the legs of the spread is at least partially filled, the auto-spreader application may generate both a scalping order and an offset order. An offset order is an order that is placed in relation to a second leg of the spread to achieve a desired spread price. A scalping order, as used herein, refers to an order that is placed in relation to a tradeable object corresponding to a leg for which a fill was detected, and that is used to offset a position created with the fill. Thus, a scalping order may be used to limit the risk of not getting filled on the other leg of the spread.

According to one example embodiment, a scalping order and an offset order are submitted to each respective matching process at one or more electronic exchanges upon detecting a fill in one of the legs of the spread. It should be understood that a trader could pre-configure a price level at which a scalping order is to be entered, and a price level for the offset order may be dynamically determined by the spread trading tool based on the spread configuration parameters. The two orders are then logically linked to manage an order quantity of each order upon detecting a fill in relation to the two orders. More specifically, the management of fills may involve monitoring fills of each linked order and dynamically lowering an order quantity in a first linked order upon detecting a fill in the second linked order. For example, a fill of the entire quantity in relation to an offset order may cause cancellation of the scalping order.

To illustrate the scalping functionality with an example, let's assume that a trader is trading a 2:1 spread, and a quantity of 10 corresponding to a buy order has been filled for the first leg of the spread at a price level of 100. To offset a position created with the first leg, the spread trading tool may determine a price level for an sell offset order based on a desired spread price, and send the sell offset order having a quantity of 5 (based on the 2:1 ratio) at the calculated price. In addition to the sell offset order, a sell scalping order would also be sent to the market corresponding to a tradeable object of the first leg of the spread. According to one example embodiment, a price level for the sell scalping order could be determined based on one or more user preconfigured rules. For example, a trader may wish to submit a sell in relation to the scalping order at a price that is one or more ticks higher than the price at which the buy order corresponding to the first leg of the spread has been filled. Also, the quantity of the scalping order is set to the quantity value that was filled in relation to the order corresponding to the first leg, which, according to this example, would be set to 10.

Let's assume that the sell scalping order having a quantity of 10 was submitted at a price of 101, while the offset order having a quantity of 5 was submitted at the calculated price for the second leg of the spread. As explained above, the sell scalping order and the second leg order are linked for quantity management purposes.

Let's now assume that a quantity of 3 has been filled in relation to the order corresponding to the second leg of the spread. Based on the preconfigured spread ratio 2:1, the quantity corresponding to the sell scalping order would be responsively reduced by 6 by sending a change and replace request to the matching process to replace the existing sell scalping order with a new sell scalping order having a new quantity of 4 at the price of 101. Then, let's assume that the full quantity of 4 has been afterwards filled with respect to the sell scalping order. Responsively to the fill, the sell order having the remaining quantity of 2 pending for the second leg of the spread would be cancelled.

While the example provided above describes an embodiment where a single scalping order is sent, it should be understood that multiple scalping orders having a total quantity equal to the desired quantity could also be sent at a plurality of price levels. For example, referring to the example provided above, a first scalping order having a quantity of 5 could be submitted at a price level of 101, and a second scalping order having also a quantity of 5 could be submitted at a price level of 102. Different embodiments are possible as well.

C. Smart Hedging

As described above, an automated trading tool may send an order in one leg of the spread and when that order gets filled (or matched), the automated trading tool automatically sends an offsetting order to the other leg of the spread. Generally, this offsetting order is placed at a market price so that it can fill as soon as possible. Once the offsetting order gets filled, the spread is complete. Sometimes, pay-up ticks are used (such as described above) to increase the chances of the offsetting order getting filled.

Additionally, some auto-spreader applications are configured to actively quote all legs of the spread at the same time to increase the chances of achieving the spread. Using the above example, the automated trading tool would send an order in each leg of the spread and when one of the leg orders gets filled, the automated trading tool would automatically send an offsetting order to the other leg of the spread (similar to the example above), but also would cancel the remaining leg orders so as not to get double filled. However, in many instances, such as when pay-up ticks are used in relation to the leg orders, the existing order in the offsetting leg of the spread may be at a price level that achieves the desired spread price. Thus, deleting such an order may result in the loss of the valuable queue position that a trader could have had if the order was not deleted.

According to one example embodiment, a trader may activate smart hedging when defining a spread such that an order already placed in a leg can be used as the "offsetting order." The smart hedging functionality could be activated with respect to each leg of the spread, as shown in FIG. 9. When the smart hedging field is activated while the two legs are being actively quoted, and one of the leg orders gets fully or partially filled, the spread trading application may determine if the order pending in the other leg of the spread is at a price level that results in the desired spread price. The auto spreader application may also check if a quantity corresponding to the pending order is sufficient to offset the fill quantity.

If the pending order is at a preferred price level and the quantity is at least equal to that needed to offset the fill, the order will be left unmodified and an offsetting order will not be sent to that leg—instead the already pending order in that leg will be used as the "offsetting order." If the quantity is less than needed, the auto spreader application may submit another order at that price to achieve a desired spread. If the pending order is not at a price level that would result in the desired spread price, the pending order would be cancelled and a new order would be placed at the calculated order price that achieves the desired spread price.

To illustrate how the smart hedging works, let's assume that two leg orders having order quantities of 5 are being actively quoted for a 1:1 spread. Also, let's assume that an order quantity of 3 gets filled in the first leg order. Upon detecting the fill in the first leg, the auto spreader application will determine if the order pending at the second leg is at a price level that would result in the desired spread price. Assuming that it is, the order corresponding to the second leg would be left unchanged and a new offsetting order will not be sent. Then, if the auto spreader application determines that the second leg of the spread is to be re-quoted, the auto spreader may lower the quantity of the existing order to 3 and send a new order having an order quantity of 2 at a new price for the second leg. The auto spreader application may lower the order quantity corresponding to the second leg order by sending a change command to the matching engine.

It should be understood that when the smart hedging functionality is used when queue holder orders are submitted with respect to the second spread leg, the order quantity of each queue holder order would be modified upon detecting a fill with respect to the first leg order. For example, in relation to the example provided above, a change request to change an order quantity from 5 to 2 would be sent to a matching process for each queue holder order upon detecting the fill of 3 with respect to the first leg order. It should be understood that different embodiments are possible as well.

VIII. Market Depth Order Entry

While an order ticket is one method that can be used by a trader to enter spread orders, the trader could enter orders using different methods as well. One such method involves entering spread order via a graphical interface that displays market information associated with a predefined spread, such as a graphical interface 1000 illustrated in FIG. 10. However, it should be understood that different graphical interfaces that allow a trader to enter orders could be used as well.

The graphical interface 1000 is an example trading screen and includes a value axis 1002 that indicates values representing prices or some other derivative of price, such as yield, determined for the spread. The prices or some other derivatives of price for the spread are determined based on market data of the underlying tradeable objects defined for the spread, the methods of which are commonly known in the art. While the values are displayed along a vertically oriented axis, the values may be displayed along a horizontally oriented axis or along an axis positioned at some other angle. Once the value axis 1002 is generated, quantity and price information contained in the market data feeds corresponding to tradeable objects of the spread is received and used to calculate spread data. The calculated data is then used to populate the display against the value axis 1002. As new quantity and price information arrives from the electronic exchange, the graphical interface 1000 is preferably updated to reflect any market changes.

The graphical interface 1000 includes a bid quantity column 1004 and an ask quantity column 1006 that display bid and ask quantities, respectively. The bid and ask quantities are displayed in the locations that correspond to their respective value or price levels along the value axis 1002. By looking at the graphical interface 1000, the trader can quickly locate the inside market, which refers to the highest bid price and the lowest ask price, which in the example shown in FIG. 10 correspond to prices 30 and 35, respectively. Further, using the graphical interface 1000, a trader can view how much quantity is available at various price levels. For example, following the best bid and the best ask, there is a bid quantity of 52 at the price level of 29, and an ask quantity of 29 at a price level of 36. Other levels of market depth are also shown, as illustrated in FIG. 10.

The graphical interface 1000 also shows additional parameters, such as a working quantity column 1008 that illustrates a working buy order indicator 1010 having an order quantity of 10 at the price level of 30. The interface 1000 also includes a last traded quantity column 1012 that, in this example, displays a last traded quantity indicator 1014 corresponding to the quantity of 5 that was traded at a price level of 35. In addition to the indicators described above, the interface 1000 includes a default quantity field 1016, a number of quantity selection icons 1018, a clear all "CLR" icon 1020, and a delete all orders ("Del All") icon 1022. It should be understood that additional indicators could be provided in relation to the interface 1000, and what is actually shown in the interface 1000 could be user configurable.

As the market conditions of the tradeable objects underlying the spread change, the bid and ask quantity indicators in the bid quantity column 1004 and the ask quantity column 1006 move relative to the value axis 1002. Thus, a trader can easily tell, among many other things, if the market has moved up or down. A trading screen similar to that shown in FIG. 10 is commercially available as MD Trader™ in the X_TRADER® product offered by Trading Technologies International, Inc. of Chicago, Ill. Further, various aspects of the trading screen in FIG. 10, including the dynamic movement of the bid and offer indicators against an axis, are described in U.S. Pat. No. 6,772,132. Adjustable viewing of the axes, including the consolidation of price levels and quantities, is described in U.S. patent application Ser. No. 09/971,087, filed on Oct. 5, 2001, and entitled, "Click Based Trading with Intuitive Grid Display of Market Depth and Price Consolidation." A variety of trading tools that can be used with the trading screen to assist in visualizing the market are further described in U.S. patent application Ser. No. 10/125,894, filed on Apr. 19, 2002, and entitled, "Trading Tools for Electronic Trading." The entire content of each of the above-referenced applications is incorporated herein by reference.

Figure 10:
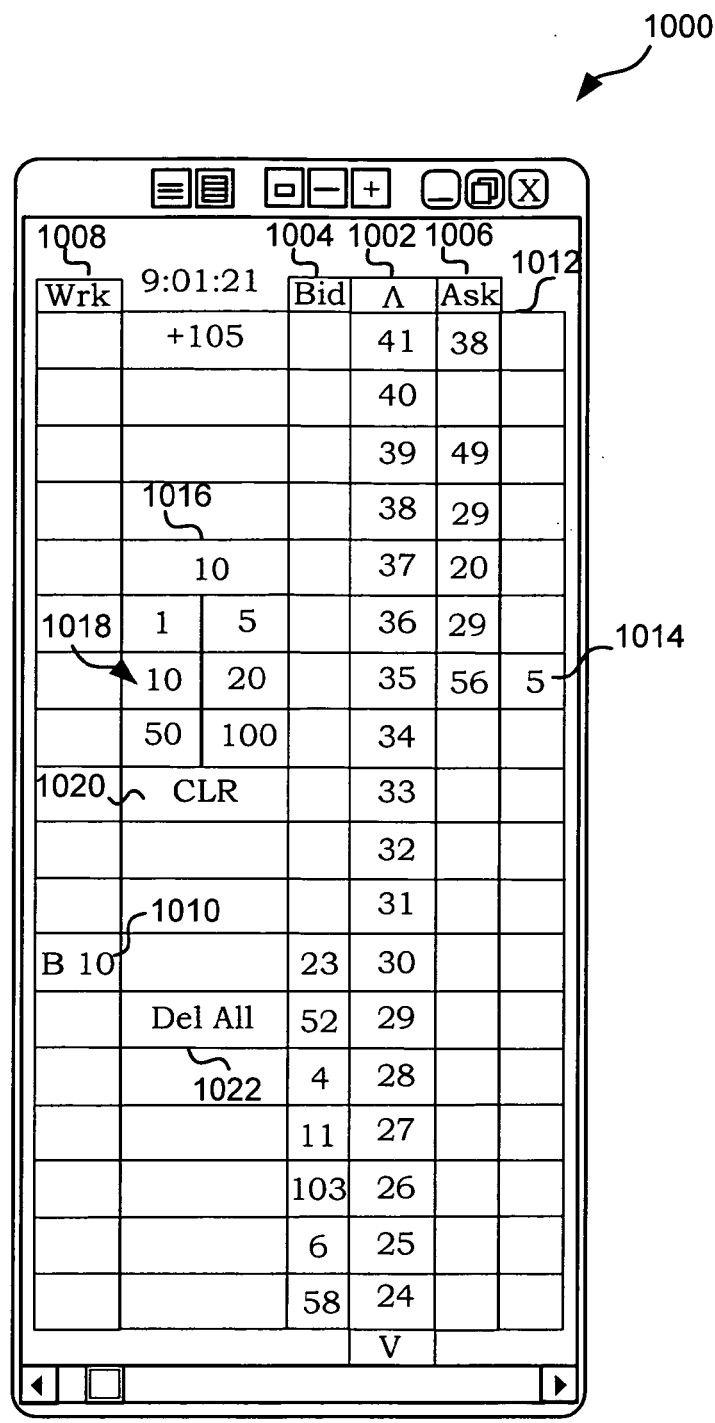
FIG. 10 illustrates an example trading interface that is used to illustrate placing of a spread order according to one example embodiment.

The intuitiveness of the example trading screen shown in FIG. 10 results from the dynamic display of quantities shown in the bid column 1004 and ask column 1006 positioned along the value axis 1002. Locations in alignment to the values along the value axis 1002 are, in essence, fixed in relation to the value or price levels. For example, a location in the ask column 1012 corresponding to the price level of 35 is fixed to the price of 35. Similar applies to the location in the bid column 1004 corresponding to the price level of 35. While the locations in the bid and ask columns are shown horizontally to the location of the corresponding price level, different embodiments are possible as well. For example, the locations corresponding to a specific price level could be positioned at some angle. As the market climbs up or down in value, the user can quickly view the change since the indicators in the bid and ask quantity columns 1004 and 1006 will move up or down, respectively, along the value axis 1002 to reflect the market change.

If the market starts to go out of view, the market can be re-positioned along the value axis 1002, responsive to which, the locations will become fixed in relation to a new set of price levels. Repositioning of the market information may occur automatically or manually. It should also be noted that the layout of different columns in FIG. 10 is only an example layout, and the columns could be repositioned, so that the bid, ask, and value columns could be rearranged. For example, the bid column 1004 could be next to the ask column 1006.

To enter an order using the graphical interface 1000, a trader can preset a default quantity at 1016 using quantity selection icons 1018, and then using an input device, select a cell in the bid or ask column corresponding to a desired price of the order. For example, if the cell in the bid column 1004 associated with the price level of 30 is selected, then a buy spread order having an order quantity of 10 (determined based on the default quantity at 1016) would be automatically entered. A working order icon, such as the one at 1010, would then be displayed in the working order column 1008. A trader could similarly enter a sell spread order by selecting a desired cell in the ask column 1006.

According to one example embodiment, a mouse input device could be used to position a cursor over a cell and upon selection of the mouse button (either upon the down stroke of the mouse button or upon release of the button, however programmed), a spread order may be submitted for processing by the automated spread trading application. Once the spread trading application processes the spread orders and determines order parameters for each individual leg of the spread, the orders for each tradeable object corresponding to the spread may be submitted to their respective electronic exchanges. In the example embodiment described above, a trader could distinguish a buy order from a sell order by selecting a location in either the bid column 1004 or the ask column 1006, respectively. In another example embodiment, buttons on the input device could be programmed so that when a particular button is pressed, it sends a buy order, and when another button is pressed, it sends an ask order.

In yet another example embodiment, a keyboard may have keys that are associated with the price levels displayed on the graphical interface, and a trader could initiate a spread order by selecting the keys. According to the example embodiment, initiating a spread order includes sending leg orders to one or more host exchanges once the spread trading application processes the spread order parameters to determine order parameters for each leg order. It should be understood that before an order is sent to an exchange, different applications, such as a risk management tool, or yet some other application, could be programmed to process the order and prevent the order from being sent to the exchange if certain criteria occur.

Figure 11:
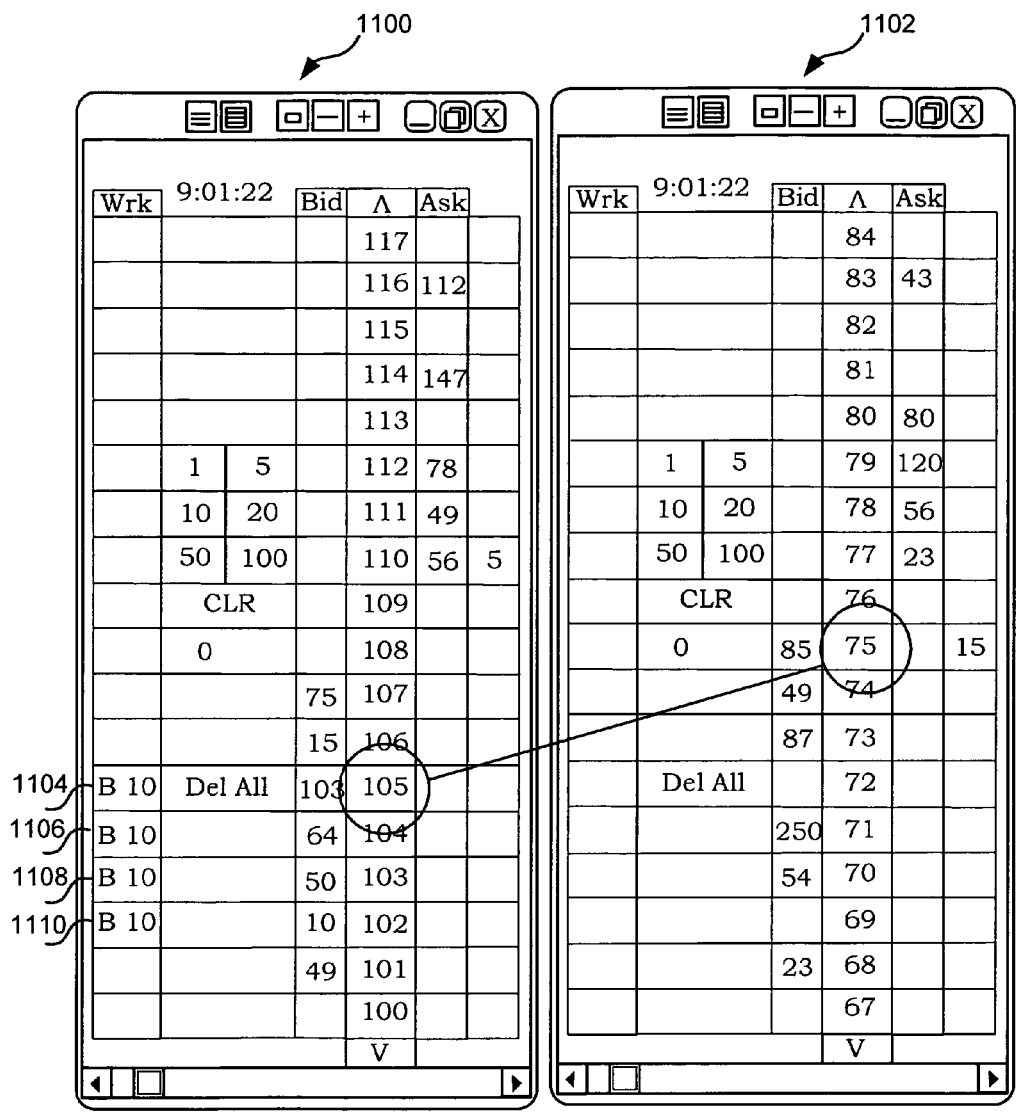
FIG. 11 illustrates an example trading interface that is used to illustrate placing of a number of queue holder orders in one leg of the spread according to one example embodiment.

FIG. 11 is a block diagram illustrating two trading interfaces 1100 and 1102 that will be used to describe a method for placing queue holder orders in relation to a tradeable object that was defined for one leg of a spread.

The trading interfaces 1100 and 1102 are of the type illustrated in FIG. 10; however, it should be understood that the example embodiments are not limited to any order entry mechanism. In the example embodiment, it is assumed that the market data displayed in the interfaces 1100 and 1102 corresponds to two tradeable objects that underlie the spread market data illustrated in relation to FIG. 10.

Referring back to FIG. 10, when a trader enters a spread order having an order quantity of 10 at a spread price level of 30, the automatic spread trading tool may process the spread order and use the market information corresponding to the second tradeable object in FIG. 11 to determine a price level for a first spread leg order to achieve a desired spread price. More specifically, as shown in FIG. 11, with the best bid corresponding to the second tradeable object at the price level of 75, a buy spread leg order for the first tradeable object is calculated to be at the price level of 105 to achieve the desired spread price of 30. Based on the example embodiments, in addition to submitting the buy spread leg order for the first tradeable object, as shown at 1104, three additional order queue holder orders are submitted as well. According to the example embodiment illustrated in FIG. 11, the three additional orders are submitted at three consecutive price levels below the price level of 105. Three working queue holder orders for the spread leg of the first tradeable object are shown at 1106, 1108, and 1110. As explained earlier, the number of queue holder orders is based on user configuration, and fewer or more queue holder orders could be submitted to the electronic exchange as well.

Figure 12:
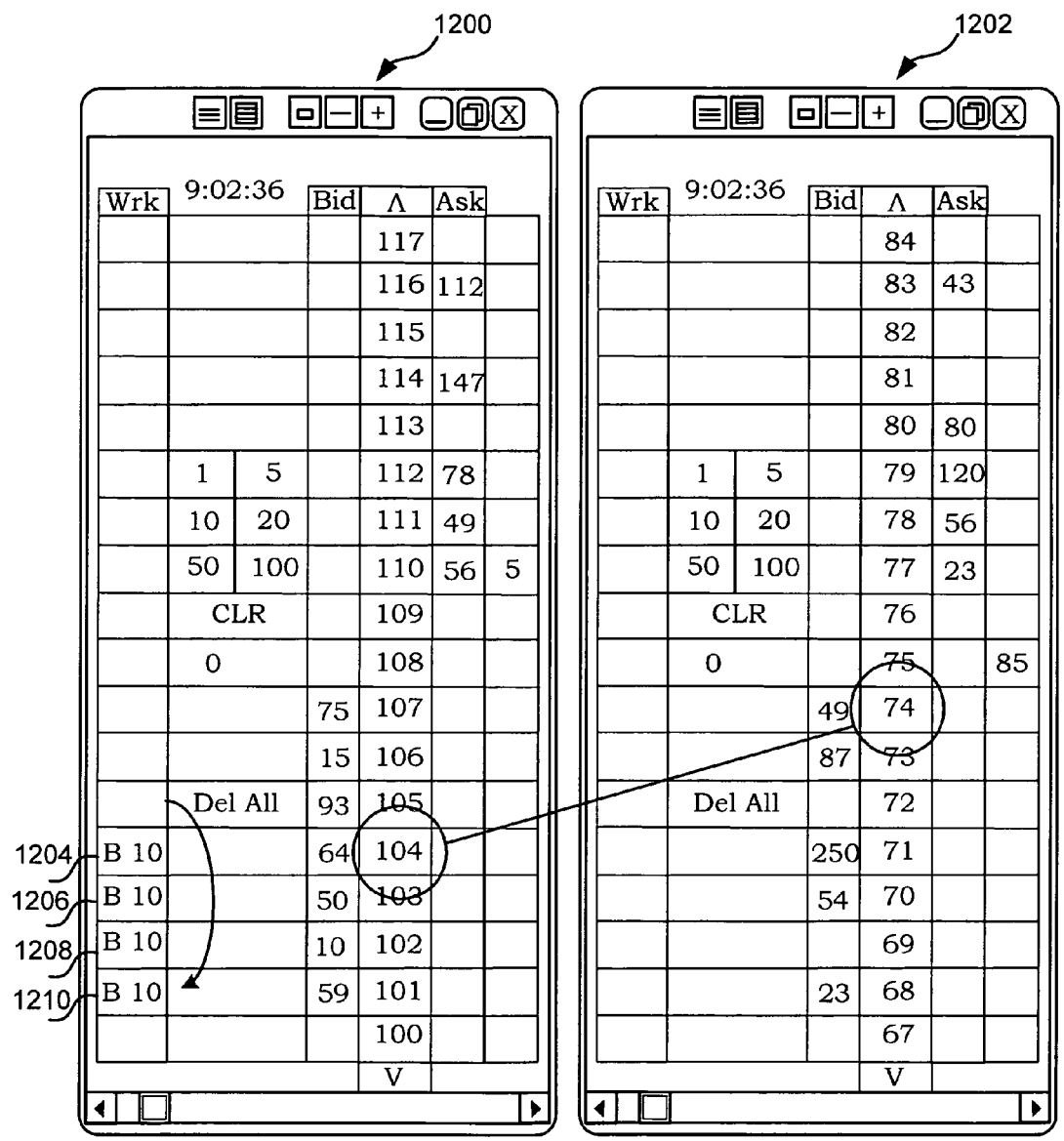
FIG. 12 illustrates an example trading interface that is used to illustrate how queue holder orders based on market changes in a second leg of the spread according to one example embodiment.

FIG. 12 is a block diagram illustrating two trading interfaces 1200 and 1202 that will be used to illustrate how queue holder orders are modified upon detecting a change in market conditions. More specifically, as illustrated in FIG. 12, market data corresponding to the tradeable object shown in relation to the trading interface 1202 has moved such that the best bid is now at the price level of 74 as compared to the earlier price level of 1102, as shown at the interface 1102 of FIG. 11. As the market moves, the auto-spreader application may calculate a new spread leg order price, which, according to this example embodiment, falls at 104. However, rather than placing a new spread leg order at that price, there is already an existing queue holder order pending at that price, the order 1106 shown in FIG. 11. To maintain the preset queue holder number of 4, a new order 1210 at the price level of 101 is submitted. As shown in FIG. 4, there are four currently pending orders at the price levels of 104, 103, 102, and 101, with the orders 1204, 1206, and 1208 corresponding to the earlier placed queue holder orders 1106, 1108, and 1110 that were shown in relation to FIG. 11.

Figure 13:
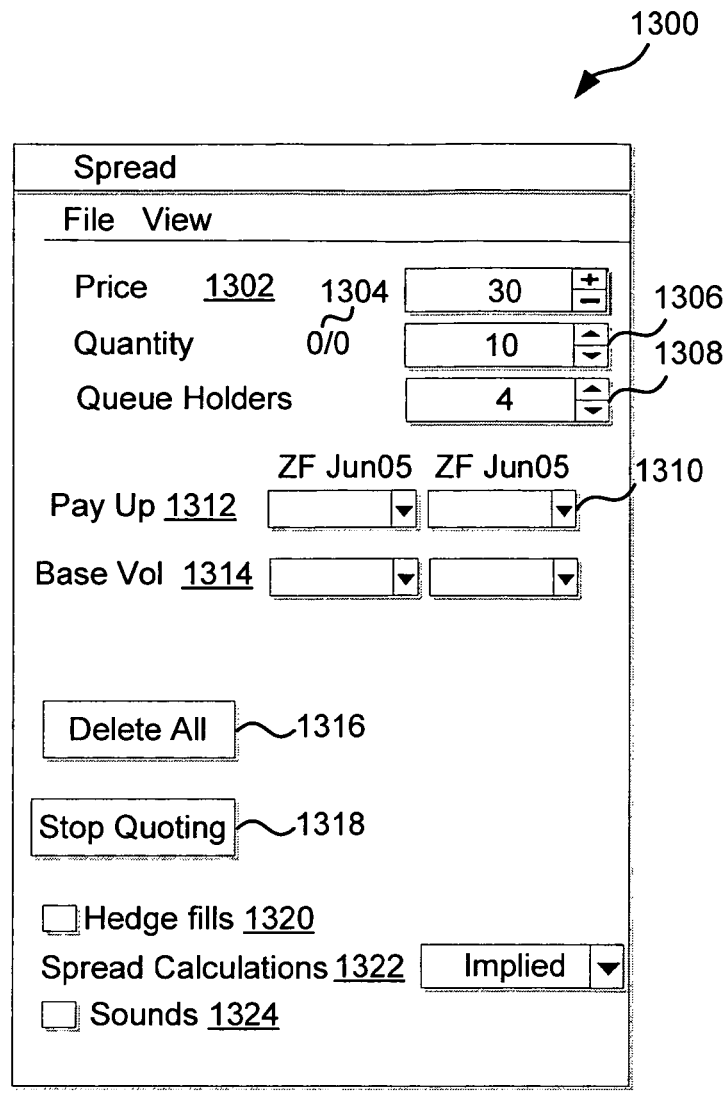
FIG. 13 illustrates a trading interface that shows an execution status corresponding to a spread order according to one example embodiment.

While the spread orders are being executed, a trader could also view an execution status of a spread via a status interface. FIG. 13 is a block diagram illustrating an example graphical interface 1300 that shows an execution status corresponding to a spread order and that allows a trader to perform additional operations related to the spread order.

The graphical interface 1300 includes a price field 1302 that shows a spread price level. The background of the price field 1302 could be color-coded to indicate if the spread is being bought or sold. According to one example embodiment, "Quantity" field 1306, "Queue Holder" field 1308, and "Spread Calculation" field 1322 are fixed and cannot be changed during the execution of the spread. A trader can view the quantity covered for each of the legs via quantity field 1304. The covered quantity field could also be linked to another computing application that can use the filled quantities in some other calculations.

The interface 1300 also displays "Pay-Up" tick values and "Base Volume" that are used in relation to each leg of the spread, as shown at 1312 and 1314. A trader could also delete all spread leg orders pending at the exchange(s) by selecting "Delete All" field 1316. "Hedge fills" field 1320 can be activated to automatically send a hedge order in the spread leg for which the field 1320 is activated upon a fill of the spread order in the other leg. A trader could deactivate the "Hedge fills" functionality if the trader, for example, does not want to submit an offsetting order in the other leg of the spread, but rather wants to manually submit an offsetting order in the leg for which a fill was detected to potentially make profit on changing market conditions in that leg. The interface 1300 also provides "Sounds" field 1324 to activate different sounds that can be played to alert a user when different user-configured events are detected.

Using a typical automated spread trading application, and depending on the market conditions of each tradeable object underlying the spread, the spread leg orders may be often re-quoted to achieve a desired spread price. However, in some instances, a trader may wish to complete a spread trade even if the currently pending orders will not result in the desired spread price. A trader could manually stop quoting each leg of the spread by selecting "Stop Requoting" field 1318. According to one example embodiment, selection of the "Stop Requoting" field 1318 may result in freezing of all queue holder orders at their current price levels. When quoting is disabled, a trader could once again restart quoting by selecting the "Stop Requoting" field 1318.

According to another example embodiment, the stop quoting functionality could be activated automatically upon detecting one or more user-defined stop quoting conditions. For example, the stop quoting conditions could be based on order related status, such as when one of the orders crosses the inside market, or when a trader selects "Delete All" field 1316. Also, requoting may be stopped when all legs have been filled, or upon detecting an error from another application, such as Excel. The requoting could also be stopped based on exchange related conditions, such as, when submission of an order failed. The stop requoting conditions could also be based on market depth corresponding to one or more tradeable objects underlying a spread. One such criterion could be based on thin depth, which may be detected when a total quantity available at the first price level of the queue holder order is not sufficient to support the spread. The thin depth may be calculated based on a user-defined equation, such as the one described earlier. Also, another stop requoting condition could be based on market volatility, such as when the price movement of one or more tradeable objects underlying a leg is higher than a user defined value. According to another embodiment, the stop requoting functionality could be activated based on the movement of queue holder orders. For example, the stop requoting could be automatically activated if one of a queue holder orders has to be moved more than twice the number of queue holders, or yet some other user-defined number, in a single move. It should be understood that different conditions could be programmed as well to automatically trigger the stop requoting functionality.

It will be apparent to those of ordinary skill in the art that methods involved in the system and methods described above for spread orders or yet some other orders generated by the automatic or semi-automatic applications may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method for trading in an electronic trading environment, comprising:

detecting, by a computer device, that at least a portion of an order quantity of a first order for a first tradeable object was filled at a first price by a first electronic matching process corresponding to the first tradeable object, wherein the first order is associated with a trading strategy comprising at least the first tradeable object and a second tradeable object, and wherein the trading strategy further comprises a desired price for the trading strategy;

determining, by the computer device, a plurality of quantities for a plurality of offset orders for the second tradeable object to offset the at least a portion of the order quantity of the first order that was filled, wherein the plurality of quantities are determined according to a quantity allocation rule that is used to divide an offset order quantity for the second tradeable object between the plurality of offset orders, wherein the offset order quantity is based on at least the portion of the order quantity that was filled and further based on the trading strategy;

determining, by the computer device, a plurality of prices for the plurality of offset orders, wherein the plurality of prices are determined based on the first price of the first order, further based on the desired spread price, and further based on a fractional pay-up tick value; and automatically sending, by the computer device, the plurality of offset orders having the plurality of quantities at the plurality of prices to a second electronic matching process corresponding to the second tradeable object.

2. The method of claim 1, further comprising:

determining a second price level for the second tradeable object to achieve the desired price associated with the trading strategy; and applying the fractional pay-up tick value to the second price level to determine the plurality of prices for the plurality of offset orders.

3. The method of claim 2, wherein the fractional pay-up tick value is added to the second price level.

4. The method of claim 2, wherein the fractional pay-up tick value is subtracted from the second price level.

5. The method of claim 2, wherein the second price level comprises an inside market price.

6. The method of claim 2, wherein the second price level comprises a price other than an inside market price.

7. The method of claim 1, further comprising:

defining the trading strategy comprising the desired price; and placing the first order at the first price for the first tradeable object at the first electronic matching process, wherein the first price is determined based on the desired price of the trading strategy and further based on market conditions in the second tradeable object.

8. The method of claim 1, wherein the trading strategy comprises a spread strategy, wherein the spread strategy comprises a first leg associated with the first tradeable object and a second leg associated with the second tradeable object.

9. The method of claim 1, wherein the quantity allocation rule is based on a formula.

10. The method of claim 9, wherein the formula comprises a variable based on market data.

11. The method of claim 9, wherein the formula comprises a variable based on trader related data.

12. The method of claim 1, wherein the quantity allocation rule comprises a ratio.

13. The method of claim 1, wherein the quantity allocation rule comprises a percentage.

14. The method of claim 1, wherein the fractional pay-up tick value is based on a formula.

15. The method of claim 1, wherein the fractional pay-up tick value is a positive value.

16. The method of claim 1, wherein the fractional pay-up tick value is a negative value.

* * * * *